Jan. 13, 1970    H. GERBER    3,488,961
METHOD AND APPARATUS FOR REGULATING
A STEAM HEATING-POWER PLANT
Filed Feb. 5, 1968
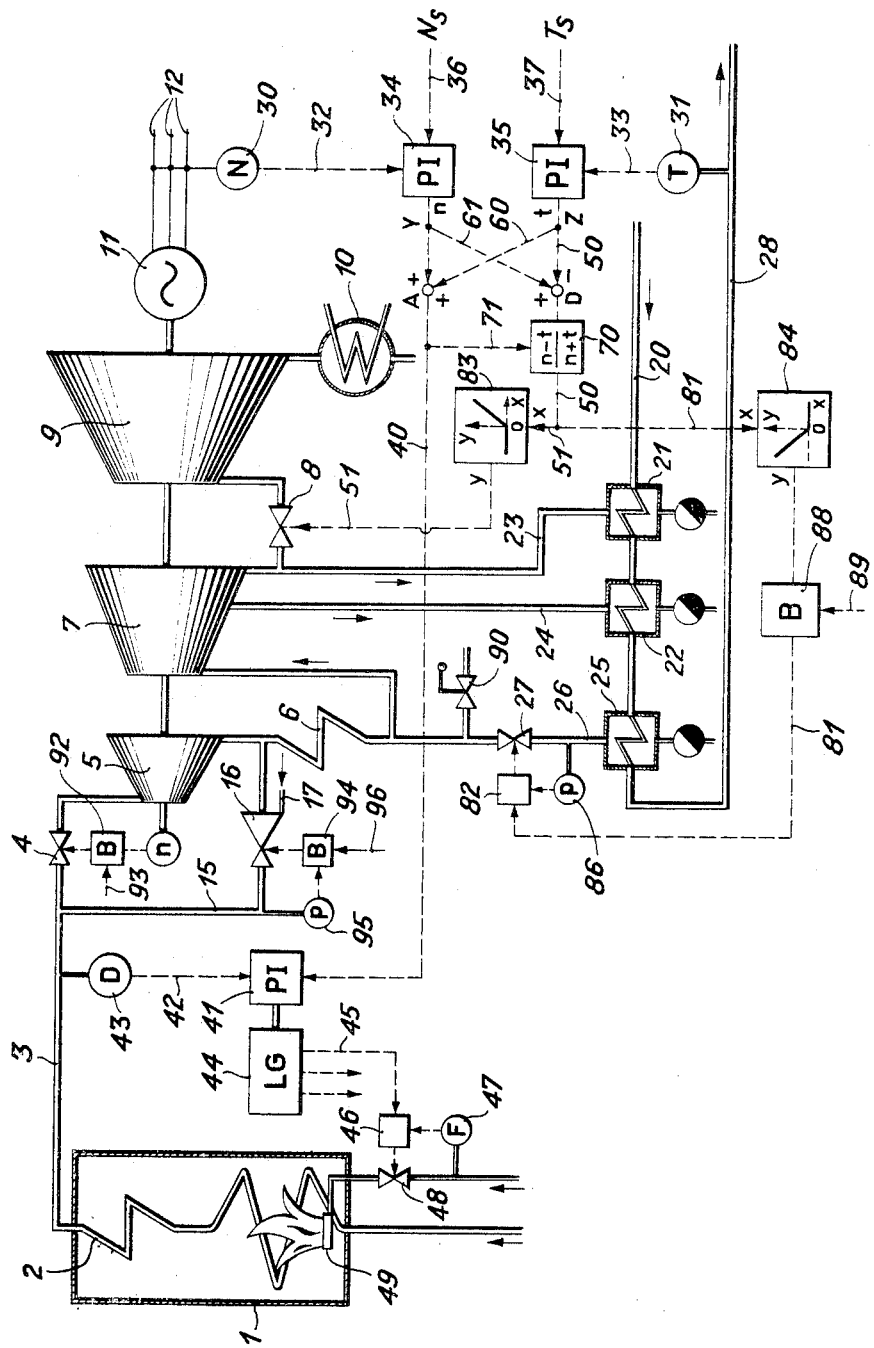
Inventor:
HANSRUEDI GERBER
BY
Kenyon & Kenyon
ATTORNEYS United States Patent Office 3,488,961
Patented Jan. 13, 1970

3,488,961
METHOD AND APPARATUS FOR REGULATING A STEAM HEATING-POWER PLANT
Hansruedi Gerber, Winterthur, Switzerland, assignor to Sulzer Brothers, Ltd., Winterthur, Switzerland, a corporation of Switzerland
Filed Feb. 5, 1968, Ser. No. 703,001
Claims priority, application Switzerland, Feb. 6, 1967, 1,733/67
Int. Cl. F01k *13/00;* F01b *31/16;* F02b *41/10*
U.S. Cl. 60—105                               9 Claims

ABSTRACT OF THE DISCLOSURE

The heat and power output signals from the respective regulators are added together to produce a sum signal to control the steam raising plant and subtracted from each other to produce a difference signal to control the steam withdrawal rate from the turbine so that the steam production rate and steam withdrawal rate automatically adjust to each other. A quotient signal is also produced by division of the difference signal by the sum signal to selectively control steam withdrawal at the first and second steam tapping points to provide for more than optimum heat delivery.

---

This invention relates to a method and apparatus for regulating a steam heating-power plant. More particularly, this invention relates to a method and apparatus for regulating a steam heating-power plant for variable heat and power consumption.

Heretofore, steam heating-power plants have been known to have controls for regulating the heat or power consumption. Further, it has been known to obtain the heating steam from the turbine of such plants as positions where the steam pressure corresponds to that saturated steam temperature which is just sufficient for heating purposes. In this way, the greatest possible proportion of combustion heat liberated in the steam raising plant is converted into the more valuable mechanical or electrical forms of energy without the need to dissipate heat losses in a cooling condenser. Where such a system cooperates, for example, with hydraulic storage systems, it has been possible for more than optimum heat delivery to become necessary during a winter period. For example, in some plants, where heating steam is tapped from a turbine, means have been provided to form a control signal in response to a deviation from a set value of the delivered mechanical or electrical power as well as another signal in response to a deviation from a set value of the effective delivered heat. These signals have each been integrated in suitable integrating means with the output from the integrating means for the power deviation being adapted to regulate the steam raising rate and the output from the integrating means for the heat deviation being adapted to regulate the rate of heating steam withdrawal.

However, while these controls have been satisfactory for a pair of set values where the deviations or disturbances have been of a slow nature, such has not been feasible for disturbances of a faster nature. Further, optimum operation of such plants has not been possible for a specified heat output.

Accordingly, it is an object of the invention to regulate the heat and power output of a steam heating-power plant in accordance with a pair of set values.

It is another object of the invention to obtain optimum operation of a steam heating-power plant for a specific heat output by adjusting the power set value to a very low value.

It is another object of the invention to vary the output of a steam raising plant in response to changes in set values for power output and/or heat output rapidly and without hunting.

It is another object of the invention to tap steam upstream from an optimum point in the power plant in a regulated controlled manner.

It is another object of the invention to automatically adjust the power output and rate of steam withdrawal to each other.

Briefly, the invention provides a steam heating-power plane with a control in which the heat and power output are regulated in accordance with a preselected pair of set values for heat and power. The control of the operation of the plant is also such that, with a given heat delivery, the steam raising plant output automatically adjusts itself so as there is no dissipation of heat. This allows the plant to operate under optimum conditions with the power delivery being adapted freely to such operation.

The method of the invention resides in forming and integrating separate output signals in response to deviations from a set value of the delivered power and of the delivered heat in a conventional manner and of forming a sum signal and a difference signal from these integrated signals. The sum signal which is formed by adding of the integrated signals together is used to regulate the steam raising rate while the difference signal which is formed by subtraction of the integrated signals from each other is used to regulate the rate at which heating steam is drawn off. In this way by a simple adjustment of the set values, that is, without changeover switching, the plane can be operated in accordance with a preselected pair of set values to control the heat and power output. Also, the plant can be operated so that with a given heat delivery, the steam raising plant output automatically adjusts itself to avoid dissipation of heat whereby the plant operates under optimum conditions with the power delivery adapting itself freely to such operation. The optimum operation for a specific heat delivery can also be obtained by adjusting the set value for power to a very low value, for example, zero.

The invention can also utilize a method wherein the steam raising plant output follows a change of set values relating to output and/or heat in a rapid manner without hunting. In this instance, the difference signal which is produced is divided by the sum signal to form a quotient signal which is used to control the quantity of steam tapped off.

Also, in order to obtain more than optimum heat delivery, a second steam tapping point is provided upstream of the optimum tapping point of the turbine and the tapping of the steam at this point is regulated in accordance with the produced difference signal. To this end, the difference signal is converted into two signals in which the first varies, but only unidirectionally, when the difference signal varies above a certain value and the second varies, likewise only unidirectionally, when the difference signal varies below the certain value. The first signal is used to act upon a final regulating element to regulate steam withdrawal at the optimum tapping point while the second signal is used to act upon a final regulating element to regulate steam withdrawal at the second steam tapping point. Additionally, a limiting signal can be imposed upon the second signal to limit or stop steam withdrawal from the second steam tapping point.

The apparatus of the invention comprises symmetrically positioned signal lines which are placed across the signal lines for transmitting the signals corresponding to the deviations from the set values for power and for heat. The symmetrically placed lines connect with respective points whereat the generated deviation signals for power and heat are added or subtracted. The sum signal is then transmitted to a regulator for controlling the output of the steam raising plant whereas the difference signal is transmitted to a valve at the optimum tapping point to control the amount of steam tapped off.

Additionally, the apparatus of the invention includes a dividing apparatus for receiving the sum and difference signals and for dividing the difference signal by the sum signal to form the quotient signal for selectively tapping steam from the optimum or second tapping points over suitable function generators having characteristics which are mirror images of each other. Also, a limiting element is interposed in the line between the second tapping point and its associated function generator to limit the amount of steam tapped off at this tapping point.

These and other objects and advantages of the invention will become more apparent from the following detailed description and appended claims taken in conjunction with the accompanying drawing in which:

The figure schematically illustrates a steam-heating power plant incorporating the invention therein.

Referring to the drawing, the conventional plant has a steam raising plant 1 including a superheater 2 which is connected by a live steam line 3 and valve 4 to a high pressure stage 5 of a steam turbine. The steam turbine also includes an intermediate superheater 6 connected by a line to the exit of the high pressure stage 5, a medium pressure stage 7 connected downstream of the superheater 6, a line having a regulating element 8 therein for controlling the flow of steam through the line, and a low pressure stage 9 downstream of the regulating element 8 which connects with a cooling condenser 10. The steam turbine is coupled to a generator 11 which is connected via conductors 12 to an electrical distribution network (not shown) from which it can be switched off.

A pair of heat exchangers 21, 22, constructed as steam condensers are connected on the primary side via discharge lines 23, 24 to two first discharge or tapping positions on the medium pressure stage 7 of the steam turbine. In addition, the heat exchangers 21, 22 are connected to a hot water return line 20 extending from a heating network (not shown) of a heat consumer. A further heat exchanger 25, also constructed as a steam condenser, is connected on the secondary side to the return line 20 while the primary side is connected via a discharge line 26 and valve 27 to a second tapping position of the steam turbine on the hot line of the intermediate superheater 6.

A bypass line 15 with a reducing means 16 therein is connected in parallel with the valve 4 in the live steam line 3 and the high pressure stage 5 to bypass steam around the high pressure stage 5 into the superheater 6. A water supply line 17 is connected to the reducing means 16.

The regulating system of the plant comprises a power measuring apparatus 30 for measuring the electrical power supplied to the network via the conductors 12 and a heat measuring apparatus 31 for measuring the header temperature in the line 28 of the heat consumer. In the present exemplified embodiment the return temperature to be measured on the line 20 and the circulating hot water quantity are constant in terms of time. The header temperature therefore actually is a measure for the delivered amount of heat.

The outputs of the measuring apparatus 30 and 31 extend via measured value lines 32 and 33 to one PI regulator each, namely the power regulator 34 and the heat regulator 35. The aforementioned regulators are supplied from a control center via signal lines 36 and 37 respectively with adjustable set values for the power ($N_s$) and for the header temperature ($T_s$) respectively. As is known, a deviation is formed in the PI regulators as the difference between set value and measured value, whereupon an output signal is formed, comprising a first part which is proportional to the deviation and a second part representing a time integral of the deviation.

The output of the power regulator 34 delivers an "$n$" signal via a signal line 40 to a set value input of a PI regulator 41 which is supplied via a signal line 42 with a measured value. The signal line 42 is connected to the output of a steam flow meter 43 connected to the live steam line 3 to generate a signal in response to the steam flow in the line 3. The output of the regulator 41 acts upon a load transducer 44 which supplies the load-dependent control signals required for operation of the steam raising plant 1, 2. By way of example, it is shown how a control signal for the fuel quantity is transmitted via a signal line 45 to a fuel regulator circuit incorporating the fuel regulator 46. The fuel regulator 46 is also supplied from a fuel flow meter 47 with a measured value of fuel flow rate. The output of the regulator 46 then acts upon a regulating element 48 which adjusts the amount of fuel supplied to a burner 49.

The output of the heat regulator 35 delivers a signal "$t$" via signal lines 50, 51 to the regulating element 8 that in the event of a rising set value $T_s$, i.e., with a rising heat requirement, the regulating element 8 moves in the closing sense so that the steam pressure therefore rises in the heat exchangers 21, 22.

In operation, the above described plant is conventionally operated so that the power and heat output is controlled in accordance with a pair of set values $N_s$, $T_s$. The regulating cycle under such conditions functions as follows. Where the set value $N_s$ for the power output is increased on the output regulator 34, a signal is transmitted via the signal line 40 to the PI regulator 41. Next, after comparison with the signal from the steam flow meter 43, a signal is transmitted via the load transducer 44 and the set value line 45 to the regulator 46. The regulator 46 then effects an opening of the valve 48 to allow more fuel to pass to the burner 49 and thereby increases the amount of steam produced. Should the boiler operate by the floating system and the valve 4 be open, the steam turbine will receive more steam so that the pressure at the first tapping positions of the lines 23, 24 increases. During this time, the valve 27 is closed so that the heat exchanger 25 is inoperative. As the pressure increases at the final tapping positions, an increase in heat transfer to the hot water in the line 20 takes place so that the temperature in the header 28 rises. The output signal "$t$" of the heat regulator 35 therefore decreases and causes the regulating element 8 to move in the opening sense until the steam pressure in the heat exchangers has returned to the original value.

Similarly, adjustment of the heat set value $T_s$ on the regulator 35 initially has a direct effect on the header temperature in the line 28; however, due to the change in the rate of withdrawal of steam from the lines 23, 24 of the first tapping positions, the power equilibrium is disturbed. As a consequence, the power output is then re-regulated.

From the above considerations, operation in accordance with a pair of set values is feasible where the disturbances are only of a slow nature. Further, by contrast, optimum operation of the plant is clearly not possible with a specified heat output ($T_s$).

Accordingly to the invention, a regulation system is provided in the plant having a signal line 60 which is connected between a position Z on the signal line 50 and an addition point A on the signal line 40 to transmit the power signal $n$ to the point A for addition to the heat signal $t$. Also, a signal line 61 is connected in symmetry with line 60 between a position Y on the signal line 40 and a difference point D on the signal line 50 to transmit the heat signal $t$ to the point D for subtraction from the power signal $n$. The interlinking of the heat and power signals $t$ and $n$ permits an optimum operation of the plant in a simple manner by adjustment of the set values $T_s$, $N_s$ in that the steam production and steam withdrawal automatically adjust themselves to each other. That is, should the power set value $N_s$ be gradually and progressively lowered, the steam production decreases while the regulating element 8 is simultaneously moved in a closing direction. This maintains the steam pressure in the heat exchangers 21, 22 at a constant value. The power set value at which the regulating element 8 just completely closes is the optimum power corresponding to the preselected set value of the heat, a maximum of high grade power is thus produced, referred to as the delivered heat, without condensation in the condenser 10 leading to heat losses. Should the set value of power $N_s$ be further reduced, for example, to zero, the optimum operating condition is retained since the regulating element cannot close further than its fully closed position. Should the heat set value $T_s$ be then adjusted, steam production is varied via the signal lines 60 and 40 without, however, departing from the optimum operating condition.

In addition, in order to further improve the dynamic characteristics of the plant, a dividing apparatus 70 is disposed in the signal line 50 downstream of point D to receive the difference signal $n-t$. Also, the sum signal $n+t$ is supplied to the dividing apparatus 70 from the signal line 40 via signal line 71 for division into the difference signal to form a quotient signal $(n-t)/(n+t)$. This quotient signal improves the dynamic characteristics of the control system in that any adjustment of the heat element 8 varies not only the steam consumption but also simultaneously the steam raising rate in corresponding relation. By analogy, a change in the set value on the power regulator 34 provides a pilot control in the correct sense for steam consumption thus accelerating the regulating function while avoiding hunting thereof. Also, the regulating element 8 can be directly controlled through the dividing apparatus 70 without using an additional pressure regulating circuit in which the regulating element 9 would represent the final control element.

In order to provide for more than optimum heat delivery, for example, during winter, the control of the valve 27 in the line 26 to the heat exchanger 25 at the second steam tapping position is incorporated in the regulating system. To this end, the signal line 50 is bifurcated downstream of the dividing apparatus 70 into a branch signal line 51 leading to the regulating element 8 and a branch signal line 81 leading to a pressure regulator 82 controlling the opening and closing of the valve 27. Further, a function generator 83, 84 is incorporated into each of the branch lines 51, 81 to selectively regulate the regulating element 8 and valve 27. The function generators 83, 84 are constructed in a manner to function with respect to each other so that in the event of an input quotient signal varying from a value of $+1$ to a value of $-1$, the regulating element 8 first closes, and, subsequently, the signal supplied as a set value to the pressure regulator 82 rises. That is, the function generator 83 has a characteristic as shown wherein the output signal $y$ of the function generator 83 rises from zero to a certain value as the input signal $x$ from the dividing apparatus 70, starting from $-1$, rises from zero to $+1$. On the other hand, the other function generator 84 has a characteristic which is a mirror image to the characteristic of the function generator 83 in that as the input signal $x$ decreases from zero to $-1$, the output signal $y$ to the pressure regulator 82 rises from zero to a certain value; the signal $y$ remaining at zero for positive values of $x$. These function generators 83, 84 thus connect the regulating controls of the steam withdrawal regulating element 8 and valve 27 to each other such that as soon as one is fully modulated, the other comes into operation.

The steam pressure is measured downstream of the valve 27 with a pressure gauge 86 and is supplied to the pressure regulator 82 as a measured value and thus represents a rough measure for the transmitted amount of heat since the inlet temperature of the hot water into the heat exchanger 25 does not substantially vary.

A limiting element 88 which maintains the pressure set value for the pressure regulator 82 below a limiting value which may be supplied to the system from the control center via a signal line 89 is disposed in the signal line 81 downstream of the function generator 84. Adjustment of the limiting value from the signal line 89 enables the heat absorbed by the hot water in the heat exchanger 25 to be limited to a desired value or to be entirely prevented. Optimum operation is thus possible for a controlled heat delivery with both the set values $N_s$ for the power as well as for the limiting value in the signal line 89 being set to zero. Where, on the other hand, the heat delivery is to be increased relative to the power delivery, the limiting value in the signal line 89 will be raised to a greater or lesser extent.

In order to protect the steam turbine 5, 7, 9 against excessive speed, a safety regulator 92 constructed as a limiting element is connected to the steam valve 4 to regulate the valve 4 in accordance with a limiting speed signal supplied via a limiting value input 93 from the control center.

A further limiting regulator 94 which limits the boiler pressure measured by a pressure gauge 95 connected in the bypass line 15 is used to regulate the reducing means 16. A limiting value transmitted via a signal line 96 is adapted to the boiler pressure either manually from the control center or automatically. As compared with a fixedly adjusted limiting value, this allows the advantage of not requiring the steam raising plant 1, 2 to assume a substantially higher pressure level before the reducing means 16 opens in the event of turbine failure at low loads accompanied by closing of the valve. Thus, stagnation of the steam in the superheater 2 is avoided while the intermediate superheater 6 is immediately cooled.

The plant which has now been completely described is suitable for maintaining the following operating conditions:

(A) SPECIFIED POWER AND HEAT

The set values for the power $N_s$ and for the heat $T_s$ are adjusted in the control center to the desired values and the limiting value for the limiting element is set to maximum. If necessary, the regulating range can be extended to supply a greater amount of heat by greater or lesser opening of the reducing means 16, a procedure which may be obtained by lesser opening, not shown, of the reducing means 16.

(B) OPTIMUM OPERATION WITH SPECIFIED HEAT OUTPUT

The set value $T_s$ for the heat regulator is set in the control center to the desired value, the set value $N_s$ for the power regulator as well as the limiting value 89 for the limiting element 88 however is set to zero.

(C) OPTIMUM OPERATION WITH GIVEN POWER OUTPUT

This method of operation is also possible if the set value $N_s$ for the power regulator is set in the control center to the desired value, the set value $T_s$ for the heat regulator is set to maximum and the limiting value 89 for the limiting element 88 is set to zero.

(D) EXCLUSIVE HEATING OPERATION

The valve 4 is closed by setting the limiting speed to zero. The set value $N_s$ for the power regulator is set to zero, the limiting value 89 for the limiting element 88 is set to maximum and the steam raising plant is operated with the set value $T_s$ for the heat regulator, the boiler pressure being set at the limiting value 96 of the limiting element 94.

(E) EXCLUSIVE POWER OPERATION

The set value $N_s$ is adjusted to the desired power, the set value $T_s$ on the other hand is set to zero.

The regulating method according to the invention can of course also be used with regulating apparatus which are entirely different from those shown in the drawing. For example, the regulating element 8 may be regarded as the final control element of a regulating circuit for controlling the pressure in the heat exchanger 21, the output of the function generator 83 being supplied to it as reference value. In the same way, the heat transmitted in the heat exchanger 25 to the hot water can be controlled by level regulation on the primary side of the condenser 25.

What is claimed is:
1. A method of regulating a steam heating-power plant for variable heat and power consumption having a steam raising plant including means for establishing a variable steam raising rate therein, a steam turbine connected to the steam raising plant to receive steam therefrom including means for withdrawing a variable quantity of steam therefrom, and a heat consumer for receiving the withdrawn steam in heat exchange relation; said method comprising the steps of
  forming a power signal corresponding to a deviation of the power output of the turbine from a set value,
  forming a heat signal corresponding to a deviation of the heat output of the plant in the heat consumer from a set value,
  adding said power signal and said heat signal together to produce a sum signal,
  regulating the means for establishing a variable steam raising rate in response to said sum signal to adjust the steam raising rate in the steam raising plant,
  substracting said heat signal from said power signal to produce a difference signal, and
  regulating the means for withdrawing a variable quantity of steam in response to said difference signal to adjust the quantity of steam withdrawn from the turbine.

2. A method as set forth in claim 1 further comprising the steps of dividing said difference signal by said sum signal to produce a quotient signal, and imposing said quotient signal on the means for withdrawing a variable quantity of steam to adjust the quantity of steam withdrawn.

3. A method as set forth in claim 2 wherein the means for withdrawing steam includes first discharge lines connected to the optimum steam tapping point of the turbine and a second discharge line connected to a second steam tapping point of the turbine upstream of the optimum steam tapping point and which further comprises the steps of bifurcating said quotient signal into a first variable signal and a second variable signal, said first variable signal varying unidirectionally upon an increase in said difference signal above a predetermined value, said second variable signal varying unidirectionally upon a decrease in said difference signal below said predetermined value, imposing said first variable signal on the means for withdrawing steam to adjust the quantity of steam withdrawn from the optimum steam tapping point through the first discharge lines, and imposing said second variable signal on the means for withdrawing steam to adjust the quantity of steam withdrawn from the second steam tapping point through the second discharge lines whereby steam is selectively withdrawn from either of the optimum or second steam tapping points.

4. A method as set forth in claim 3 which further comprises the step of imposing a limiting value signal on said second variable signal to limit the quantity of steam withdrawn from the second steam tapping point.

5. In combination with a steam heating-power plant having a steam raising plant including means for establishing a variable steam raising rate therein, a steam turbine interconnected to said steam raising plant to receive steam therefrom including means for withdrawing a variable quantity of steam from said turbine, a heat consumer for receiving the withdrawn steam in heat exchange relation, a power output regulator connected to the output of said turbine and to a power set value signal means for generating a first signal corresponding to a deviation of the power output from a set value signal of said power set value means, and a heat output regulator connected to the output of said heat consumer and to a heat set value signal means for generating a second signal corresponding to a deviation of the heat output from a set value signal of said heat set value means; first means for adding said first signal and said second signal together to produce a sum signal, and second means for subtracting said second signal from said first signal to produce a difference signal, said means for establishing a variable steam raising rate being connected to said first means to receive said sum signal and to adjust the steam raising rate in response to said sum signal, said means for withdrawing steam being connected to said second means to receive said difference signal and to adjust the quantity of steam withdrawn in response to said difference signal.

6. The combination as set forth in claim 5 further comprising a dividing apparatus connected to said first means and said second means for dividing said difference signal by said sum signal to produce a quotient signal, said dividing apparatus being connected to said means for withdrawing steam to transmit said quotient signal thereto to adjust said means for withdrawing steam in response to said quotient signal to adjust the quantity of steam withdrawn.

7. The combination as set forth in claim 6 wherein said means for withdrawing steam includes first discharge lines connected to said turbine at the optimum steam tapping point and a second discharge line connected to said turbine at a second steam tapping point upstream of said first discharge lines.

8. The combination as set forth in claim 7 which further comprises a first function generator connected to said dividing apparatus to receive said quotient signal for generating a first unidirectionally variable signal in response to reception of a quotient signal wherein said difference signal increases above a predetermined value, a second function generator connected to said dividing apparatus to receive said quotient signal for generating a second unidirectionally variable signal in response to reception of a quotient signal wherein said difference signal decreases below said predetermined value, said first function generator being connected to said means for withdrawing steam to adjust the quantity of steam withdrawn through said first discharge lines in response to said first unidirectionally variable signal, said second function generator being connected to said means for withdrawing steam to adjust the quantity of steam withdrawn through said second discharge line in response to said second unidirectionally variable signal.

9. The combination as set forth in claim 8 which further comprises a limiting value means connected downstream of said second function generator for imposing a limiting value signal on said second unidirectionally variable signal to limit the quantity of steam withdrawn through said second discharge line.

References Cited

UNITED STATES PATENTS

| | | | |
|---|---|---|---|
| 3,166,910 | 1/1965 | Brunner | 60—107 |
| 3,244,898 | 4/1966 | Hickox | 290—40 XR |
| 3,271,960 | 9/1966 | Brunner | 60—67 |
| 3,310,683 | 3/1967 | Hottenstine | 60—106 XR |

MARTIN P. SCHWADRON, Primary Examiner

ROBERT R. BUNEVICH, Assistant Examiner

U.S. Cl. X.R.

60—64, 67; 237—12.1; 290—2, 40